(12) United States Patent
Sasaki et al.

(10) Patent No.: US 8,257,821 B2
(45) Date of Patent: Sep. 4, 2012

(54) LIGHT DIFFUSION FILM

(75) Inventors: Yasushi Sasaki, Tsuruga (JP); Yoshitomo Ikehata, Tsuruga (JP); Jun Inagaki, Tsuruga (JP)

(73) Assignee: Toyo Boseki Kabushiki Kaisha, Osaka, Osaka (JP)

(*) Notice: Subject to any disclaimer, the term of this patent is extended or adjusted under 35 U.S.C. 154(b) by 692 days.

(21) Appl. No.: 12/295,242

(22) PCT Filed: Mar. 29, 2007

(86) PCT No.: PCT/JP2007/056878
§ 371 (c)(1),
(2), (4) Date: Sep. 29, 2008

(87) PCT Pub. No.: WO2007/114258
PCT Pub. Date: Oct. 11, 2007

(65) Prior Publication Data
US 2009/0297860 A1   Dec. 3, 2009

(30) Foreign Application Priority Data
Mar. 31, 2006   (JP) ................ 2006-098232

(51) Int. Cl.
B32B 7/02 (2006.01)
B32B 27/20 (2006.01)
B32B 27/30 (2006.01)
B32B 27/32 (2006.01)
B32B 27/36 (2006.01)

(52) U.S. Cl. ........... 428/213; 428/212; 428/423.1; 428/423.7; 428/424.2; 428/424.4; 428/480; 428/483; 428/910; 359/599; 359/615; 525/165; 525/176

(58) Field of Classification Search .......... None
See application file for complete search history.

(56) References Cited

U.S. PATENT DOCUMENTS

| | | | | |
|---|---|---|---|---|
| 4,438,175 A | * | 3/1984 | Ashcraft et al. | 428/315.5 |
| 5,397,610 A | * | 3/1995 | Odajima et al. | 428/35.7 |
| 5,783,120 A | * | 7/1998 | Ouderkirk et al. | 264/1.34 |
| 5,825,543 A | * | 10/1998 | Ouderkirk et al. | 359/487.02 |
| 5,867,316 A | * | 2/1999 | Carlson et al. | 359/487.02 |
| 6,256,146 B1 | * | 7/2001 | Merrill et al. | 359/487.02 |

(Continued)

FOREIGN PATENT DOCUMENTS

JP   08-192494 A   7/1996

(Continued)

OTHER PUBLICATIONS

Schimtz, Peter et al., "Films." Ullmann's Encyclopedia of Industrial Chemistry, 5th Ed., vol. A11 (1988), pp. 85-110.*

*Primary Examiner* — Vivian Chen
(74) *Attorney, Agent, or Firm* — Leydig, Voit & Mayer, Ltd.

(57) ABSTRACT

A light diffusion film which has excellent light transmittance and light diffusibility while maintaining excellent heat resistance, mechanical strength and thickness accuracy intrinsic to a biaxially stretched film, and is suppressed in generation of curling after heat treatment, wherein the film comprises a biaxially stretched laminated film having a supporting layer consisting of a crystalline polyester, and a light diffusion layer laminated on at least one side of the supporting layer by a co-extrusion method, wherein the light diffusion layer comprises 60 to 98 parts by mass of the crystalline polyester and 2 to 40 parts by mass of a light diffusion additive incompatible with the polyester, and the light diffusion film has a planar orientation degree ($\Delta P$) of 0.080 to 0.160, a total light transmittance of 85% or more, and a haze of 30% or more.

6 Claims, 1 Drawing Sheet

Step in stretching machine (Film progression direction→)

U.S. PATENT DOCUMENTS

| | | | |
|---|---|---|---|
| 6,875,499 B1 * | 4/2005 | De Toffol et al. | 428/212 |
| 6,881,473 B2 * | 4/2005 | Takahashi et al. | 428/212 |
| 6,913,817 B2 * | 7/2005 | Klein et al. | 428/323 |
| 6,917,396 B2 * | 7/2005 | Hiraishi et al. | 349/64 |
| 6,963,447 B2 * | 11/2005 | Honda | 359/452 |
| 7,115,320 B2 * | 10/2006 | Tanaka et al. | 428/458 |
| 7,548,372 B2 * | 6/2009 | Ueda et al. | 359/599 |
| 2002/0141194 A1 * | 10/2002 | Wortman et al. | 362/309 |
| 2008/0044596 A1 * | 2/2008 | Fukagawa et al. | 428/1.2 |

FOREIGN PATENT DOCUMENTS

| | | | |
|---|---|---|---|
| JP | 09-211207 A | | 8/1997 |
| JP | 2001-205736 A | | 7/2001 |
| JP | 2001-272508 A | | 10/2001 |
| JP | 2001-324605 A | | 11/2001 |
| JP | 2002-037898 A | | 2/2002 |
| JP | 2002-162508 A | | 6/2002 |
| JP | 2002-182013 A | | 6/2002 |
| JP | 2002-196113 A | | 7/2002 |
| JP | 2002-372606 A | | 12/2002 |
| JP | 2004-219438 A | | 8/2004 |
| JP | 2004-230894 A | | 8/2004 |
| JP | 2004-354558 A | | 12/2004 |
| JP | 2005-002345 A | | 1/2005 |
| WO | WO 2005/116699 | * | 12/2005 |

* cited by examiner

LIGHT DIFFUSION FILM

TECHNICAL FIELD

The present invention relates to a light diffusion film which is used in a back light unit of a liquid crystal display, an illuminator or the like. More particularly, the present invention relates to a light diffusion film having excellent heat resistance, mechanical strength and thickness accuracy intrinsic to a biaxially stretched film, and having excellent light transmittance and light diffusibility.

BACKGROUND ART

In recent years, the technique of a light crystal display has been remarkably progressed, and has been widely used as a display device of a personal computer, a television, a cellphone or the like. Since these liquid crystal displays are such that a liquid crystal display unit alone has not the light emitting function, displaying becomes possible by mounting a back light unit on a back side thereof.

There are many modes in a back light unit, and these are roughly classified into two kinds. Generally, a most frequent mode is a mode called internal illumination mode or direct-type, in which a light source is inside an illumination surface. In this mode, since many light sources such as cold cathode-ray tubes and the like can be arranged immediately below an illumination surface, the mode has the characteristic that an extremely high luminance is obtained, and light loss is small as compared with an edge light mode described later. For this reason, a direct-type mode is frequently used in a liquid crystal display which is large-scale as in a large-scale liquid crystal TV and requires a high luminance.

However, in the direct-type mode, there is a problem that a great difference in a luminance is easily generated between a position which is immediately over a light source, and a position which is not, on a screen, and this is easily recognized as a luminance variation. For this reason, a light diffusion plate consisting of acryl or polycarbonate having a thickness of a few millimeters, in which a light scattering substance such as an organic or inorganic fine particle is mixed and, if necessary, a light diffusion film in which a surface of a biaxially stretched polyester film has been subjected to light diffusion processing are arranged on a light emitting surface, thereby, reduction in a luminance variation is tried.

The other mode is a mode called edge light-type, in which a light source is arranged outside an illumination surface, for example, a generally linear light emitting body such as a fluorescent lamp (cold cathode-ray discharge tube) is adhered to one side or two sides of a light guiding plate consisting of a transparent resin plate which is an illumination surface, and a lamp cover consisting of a reflecting body is disposed to introduce light into the light guiding plate. This mode has the characteristic that a consumed power is smaller, and miniaturization and thinning are possible, as compared with the direct-type back light unit. For this reason, particularly when thinning and weight saving are required, such as in a small display such as a notebook personal computer and the like, an edge light-type back light unit is widely used.

The necessary function which requires a light guiding plate of the edge light-type back light unit to have, includes the function of forwarding light introduced through an end part, and the function of sending the forwarded light on a liquid crystal display element side. The former function is determined depending on a material used, and interface reflection property, and the latter function is determined depending on a shape of a light guiding plate surface which avoids the total reflection condition. With respect to a shape of a light guiding plate surface for avoiding this total reflection condition, a method of forming a white diffusion material on the light guiding plate surface, and a method of forming a lenticular or prism frenel shape on the light guiding plate surface are known.

However, light emitted from the light guiding plates on which these shapes are formed has an uneven light distribution depending on the shape. Therefore, in order to obtain an image of high quality, one tries to make a luminance on a light emitting surface uniform by arranging a light diffusion film or the light guiding plate to diffuse and scatter light passing through a light diffusion layer.

In order to improve a front luminance, a condensing sheet is used in these back light units in some cases so as to collect emitting light having transmitted through the light diffusion film in a front direction as much as possible. This condensing sheet is a transparent sheet in which many fine irregularities such as a prism shape, a wave shape, a pyramid shape and the like are arranged on a surface thereof, and emitting light having transmitted through the light diffusion film is refracted to concentrate on a front surface to improve a luminance on an illumination surface. Such the condensing sheet is used, alone or by stacking two sheets, on a surface side of the light diffusion film.

Further, in order to make a luminance variation generated by disposing the condensing sheet, or a defect of the condensing sheet not remarkable, the light diffusion film is disposed also on a surface side of the condensing sheet in some cases.

And, in order to suppress loss of light to improve utilization effectiveness of light, a material having a high transmittance is required in each member (light diffusion plate, light guiding plate, light diffusion film, condensing sheet etc.) constituting the back light unit.

On the other hand, these members generally have a construction that a functional layer is laminated on a substrate film, and these members are converted into a composite by sticking them together via a pressure-sensitive adhesive. By reducing the number of supports of these members, the number of times light is reflected at an interface between members having different refractive indices, can be reduced. For this reason, it is also effective for enhancing a light utilization efficiency to reduce the number of members. On the other hand, trial to add other function (e.g., light diffusibility) to a single substrate film itself has been studied.

As the light diffusion film used in the back light unit, for example, a film obtained by molding a transparent thermoplastic resin into a sheet, and subjecting the sheet to processing of physically imparting irregularities to a surface, and a film obtained by coating a light diffusion layer consisting of a transparent resin containing fine particles on a surface of a biaxially stretched polyester film are disclosed (see e.g., Patent Literatures 1, 2).

Patent Literature 1: JP-A 4-27550
Patent Literature 2: JP-A 6-59108

Particularly, since the film obtained by coating a light diffusion layer consisting of a transparent resin containing fine particles on a film of a biaxially stretched polyester film has a high light transmittance, and has excellent light diffusibility, and has excellent heat resistance, mechanical strength and, further, excellent thickness uniformity which are characteristics of the biaxially stretched polyester film, it is widely adopted.

However, in this method, there is a problem that, when the light diffusion film is heated, curling is easily generated due to a difference in a linear expansion coefficient between a substrate film and a light diffusion layer. This problem is becoming an important problem particularly in a liquid crystal display adopting a direct-type back light unit, which is large and requires an extremely high luminance, such as a large liquid crystal TV in recent years. This is because as a light diffusion film has a larger area, an area of an interface between layers having different linear expression coefficients becomes larger, and curling becomes remarkable when the light diffusion film is heated. Further, as a display has a higher luminance, a consumed power of a light source, that is, a heating value of the back light unit becomes larger and, under such the situation, curling is more easily generated. In addition, in this method, a light diffusion layer is formed by post processing, and this is disadvantageous regarding a market's demand of a lower cost.

On the other hand, many trials to make a biaxially stretched polyester film itself have light diffusibility for the purpose of reduction in the cost have been proposed, such as reduction in the number of back light unit parts and simplification of a production process by integration with other optical functional film such as the light diffusion film and a condensing sheet. And, an approach of trying to make a biaxially stretched polyester film itself having excellent heat resistance and mechanical strength and, further, excellent thickness uniformity simultaneously have light diffusibility leads to solution of the problem of heat curling. Therefore, its industrial value is very great.

However, any of trials to make a biaxially stretched polyester film itself have light diffusibility which have previously been proposed, deteriorates any of characteristics intrinsically possessed by the biaxially stretched polyester film, or deteriorates property which should be possessed by the light diffusion film, such as light transmittance and light diffusibility, and those trials have not been put into practice. For example, a biaxially stretched polyester film consisting of a composite film of two or more layers in which at least one layer is a layer containing fine bubbles therein is disclosed (see e.g. Patent Literature 3)

Patent Literature 3: JP-A 11-268211

In this method, the film has characteristics intrinsically possessed by the biaxially stretched polyester film, such as excellent heat resistance and mechanical strength, and excellent thickness uniformity. However, light diffusibility is imparted by bubbles present inside the layer, there is a problem that a light transmittance is low. This is because since bubbles (voids) generated in a step of biaxially stretching a film have a plate-like form parallel with a film surface, when this is used as a light diffusion film in a back light unit, light emitted from an illumination surface is scattered back, deteriorating a light transmittance. Actually, a total light transmittance shown in Examples is only 83% at highest.

In addition, a multilayer-type biaxially stretched polyester film in which a substrate film consists of polyethylene terephthalate, and a low melting point polyester resin having a melting point of 200° C. or lower is used as a resin constituting a light diffusion layer is disclosed (see e.g. Patent Literature 4).

Patent Literature 4: JP-A 2001-272508

In the above method, suppression of voids appearing around a light diffusing agent and hampering transparency is taken into consideration. For this reason, balance between light transmittance and light diffusibility is comparable to that of the previous light diffusion film obtained by coating a light diffusion layer consisting of a transparent resin containing fine particles on a biaxially stretched polyester film.

However, in the light diffusion film obtained by the methods described in Patent Literature 4, there is a great difference in a melting point between a polyester resin constituting the light diffusion layer and a polyester resin constituting the light diffusion layer. As a result, since the resulting biaxially stretched film has a linear expansion coefficient different between the light diffusion layer and the substrate layer, the biaxially stretched polyester film itself becomes easy to be curled at heat treatment. For this reason, curling is generated by heat treatment at a post-processing step in some cases, or curling is generated in some cases depending on environment (temperature) under which a liquid crystal display is used, and there is a possibility that a luminance at a light emitting surface in a back light unit becomes ununiform.

In addition, there is disclosed a film in which a copolymerized polyester or an amorphous polyester, each having a melting point of 210° C. or lower, is used as a constituent resin, a light diffusion layer obtained by incorporating a light diffusion additive consisting of an incompatible particle or a thermoplastic resin in the constituent resin is disposed as an intermediate layer, and a crystalline polyester resin layer forming a smooth surface, consisting of polyethylene terephthalate, is laminated on both sides thereof (see e.g. Patent Literatures 5-11).

Patent Literature 5: JP-A 2001-324605
Patent Literature 6: JP-A 2002-162508
Patent Literature 7: JP-A 2002-182013
Patent Literature 8: JP-A 2002-196113
Patent Literature 9: JP-A 2002-372606
Patent Literature 10: JP-A 2004-219438
Patent Literature 11: JP-A 2004-354558

In the above methods, unlike Patent Literature 4, since a film has a symmetrical structure, generation of curling due to an asymmetrical structure seen in the Patent Literature 4 is improved. However, since resins having greatly different melting points or crystallizabilities are used as a constituent component, there is a potential cause for increase in generation of curling due to variation in the production condition or the like. In addition, in the above methods, a layer consisting of a low melting point copolymerized polyester resin or an amorphous polyester rein accounts for 80% or more of a total thickness of a laminated film, excellent properties such as heat resistance, mechanical strength and thickness uniformity which are characteristics intrinsic to a crystalline biaxially stretched polyester film are deteriorated. As a result, remarkable dimensional change and deterioration of planarity are generated in processing at a high temperature or use under high temperature environment, and the original object of the light diffusion film of uniformizing a luminance at a light emitting surface in the back light unit can not be attained.

In addition, a biaxially stretched polyethylene terephthalate film incorporating spherical or convex lens-like particles of a specified particle diameter is disclosed (see e.g. Patent Literature 12).

Patent Literature 12: JP-A 2002-37898

In the above Literature, a film having a total light transmittance of 88% and a diffusion transmittance of 68%, using polyethylene terephthalate as a raw material of a polyester is disclosed in Example 1. In addition, a film having a total light transmittance of 85% and a diffusion transmittance of 63% is disclosed in Example 5. These light transmittances are an excellent physical property value comparable to those obtained by coating a light diffusion layer consisting of a transparent resin containing fine particles on a surface of the biaxially stretched polyester film.

However, fundamental properties such as heat resistance, mechanical strength, thickness accuracy and the like of these films are not disclosed at all, and a possibility of obtaining heat resistance, mechanical strength and high thickness accuracy which are characteristics intrinsic to the biaxially stretched polyethylene terephthalate film is not recognized at all. The reason is as follows:

Although these films are films obtained by stretching an unstretched film having a thickness of 200 μm at each stretching ratio of 3.0 in both longitudinal and transverse directions, that is, at an area ratio of 9.0, a thickness thereof is 50 μm, and an actual area stretching ratio calculated from a ratio of thickness before and after stretching is merely 4.0.

That is, it is thought that a set stretching ratio and an actual stretching ratio have been remarkably separated by influence of a distribution of width constriction generated at longitudinal stretching, and of a stretching ratio in a width direction generated at transverse stretching and, further, a dimensional change at heat treatment. And, by stretching at an actual area stretching ratio of around 4, even when excellent light transmittance is obtained, it is almost impossible to obtain heat resistance, mechanical strength and high thickness accuracy which are characteristics intrinsic to the biaxially stretched polyester film.

From the foregoing situation, the method of making the biaxially stretched film itself have light diffusibility is inferior to the method of post-processing a light diffusion layer on a transparent substrate film in such a comprehensive quality that both light transmittance and light diffusibility are realized while maintaining heat resistance, mechanical strength and high thickness accuracy which are characteristics intrinsic to the biaxially stretched film. For this reason, this method has not been put into practice.

DISCLOSURE OF THE INVENTION

Problems to be Solved by the Invention

The present invention has the following two objects:

(1) One object is to provide a light diffusion film having excellent heat resistance, mechanical strength and thickness accuracy which are intrinsic to the biaxially stretched polyester film, and having excellent total light transmittance and light diffusibility and, thereby, promoting reduction in the number of back light unit parts, and simplification and cost saving of a production step by integration of the light diffusion film and other optical functional film.

(2) The other object is to provide a light diffusion film in which generation of curling after heat treatment due to lamination of resin layers having different linear expansion coefficients is suppressed, thereby, uniformizing a luminance of a light emitting surface in a liquid crystal display adopting a direct-type back light unit which is large and requires an extremely high luminance.

Means to Solve the Problems

The present invention is a light diffusion film consisting of a biaxially stretched laminate film having a supporting layer consisting of a crystalline polyester, and a light diffusion layer laminated on at least one side of the supporting layer by a co-extrusion method, wherein the light diffusion layer comprises 60 to 98 parts by mass of a crystalline polyester, and 2 to 40 parts by mass of a light diffusion additive which is incompatible with the polyester, and the light diffusion film has a planar orientation degree (ΔP) of 0.080 to 0.160, a total light transmittance of 85% or more, and a haze of 30% or more.

Effect of the Invention

Since the light diffusion film of the present invention is a biaxially stretched film consisting of a highly crystalline polyester, it has excellent heat resistance, mechanical strength and thickness accuracy which are intrinsic to the biaxially stretched polyester film. In addition, the light diffusion film of the present invention realizes both of a light transmittance and light diffusibility at a high level by adopting a specified layer construction, and controlling a planar orientation degree in a specified range. Further, since the light diffusion film of the present invention has high crystallizability and consists of a multilayered structure using the same kinds of polyesters as a constituent component, generation of curling after heat treatment due to lamination of resin layers having different linear expansion coefficients can be suppressed.

| EXPLANATION OF SYMBOLS |
| --- |
| 1: Transverse stretching |
| 2: Longitudinal stretching |
| 10: Pre-heating zone |
| 11: Stretching zone (film passing time: 18 seconds) |
| 12: Heat treating zone |

BEST MODE FOR CARRYING OUT THE INVENTION

The light diffusion film of the present invention is a light diffusion film consisting of a biaxially stretched laminate film having a supporting layer consisting of a crystalline polyester, and a light diffusion layer laminated on at least one side of the supporting layer by a co-extrusion method, wherein the light diffusion layer comprises 60 to 98 parts by mass of the crystalline polyester and 2 to 40 parts by mass of a light diffusion additive which is incompatible with the polyester, and the light diffusion film has a planar orientation degree (ΔP) of 0.080 to 0.160, a total light transmittance of 85% or more, and a haze of 30% or more.

(Raw Material)

The crystalline polyester used in the present invention is arbitrary without any limitation as far as it a polyester for which a clear crystal melting heat peak (melting point) is observed by measurement using a differential scanning calorimeter. However, in order to attain excellent heat resistance, mechanical strength and thickness accuracy which are intrinsic to the biaxially stretched polyester film, a melting point of a crystalline polyester used as a raw material is preferably 250° C. or higher, further preferably 253° C. or higher.

A preferable upper limit of a melting point is 300° C. And, a crystal melting heat amount is preferably 15 mJ/mg or more, further preferably 20 mJ/mg or more, most preferably 30 mJ/mg or more. A preferable upper limit of a crystal melting heat amount is 50 mJ/mg. Examples of the most preferable crystalline polyester having such the property include a homopolymer of polyethylene terephthalate, or polyethylene naphthalate. Polyethylene terephthalate is most excellent in the cost performance.

Alternatively, if necessary, the crystalline polyester may contain a copolymerization component. By introducing a small amount of the copolymerization component into a polyester, it is possible to control a planar orientation degree of a biaxially stretched film.

Examples of the component copolymerizable with the crystalline polyester include polyesters produced by polycondensing aromatic dicarboxylic acid such as isophthalic acid, and naphthalenedicarboxylic acid or an ester thereof, and a glycol such as diethylene glycol, 1,3-propanediol, 1,4-butanediol, and neopentylglycol. These polyesters can be produced by a transesterification method of transesterification-reacting an alky ester of aromatic dicarboxylic acid and a glycol, followed by polycondensation, or a method of polycondensing a diglycol ester of aromatic dicarboxylic acid in addition to a direct polymerization method of directly reacting aromatic dicarboxylic acid and glycol.

However, since when these copolymerization components are excessively introduced, a melting point of a polyester is lowered, and excellent properties which are intrinsic to the biaxially stretched polyester film are not obtained, attention must be paid. A preferable upper limit of a content of the copolymerization component is 5 mol %, and a further preferable upper limit is 3 mol %. By adopting a content of the copolymerization component of 5 mol % or less, a melting point of a polyester can be maintained at 250° C. or higher, and excellent heat resistance, mechanical strength and thickness accuracy which are intrinsic to the biaxially stretched polyester film can be attained.

In addition, it is preferable that the polyester does not substantially contain a particle other than the light diffusion additive described later. The "does not substantially contain" means, for example, in the case of an inorganic particle, such a content that when an inorganic element is quantitated by fluorescent X-ray analysis, the content is 50 ppm or lower, preferably 10 ppm or lower, most preferably not higher than a detection limit. By using an impurity-free clean polyester raw material like this, generation of an optical defect in the light diffusion film for a liquid crystal display can be suppressed.

(Light Diffusion Additive)

The light diffusion additive in the present invention is arbitrary without any limitation as far as it is a material incompatible with the polyester, and it is preferable to use the following material.

(1) Thermoplastic Resin Incompatible with Polyester

As the light diffusion additive used in the present invention, a thermoplastic resin incompatible with a polyester is most preferable. That is, this is the technique of utilizing incompatibility between a crystalline polyester and a thermoplastic resin to form a domain consisting of a thermoplastic resin which is incompatible with a crystalline polyester, and dispose the domain into a matrix consisting of the polyester in a step of producing a biaxially stretched film (a melting/extruding step), and utilizing this as a light diffusion material.

By using the technique, a foreign matter can be filtered with a high accuracy filter in a step of melting/extruding a film to attain a necessary cleanness degree for the light diffusion film for a liquid crystal display.

To the contrary, in the case where a non-melting polymer particle or an inorganic particle described later is used as a light diffusion additive, when a pore diameter of a filter is reduced in order to remove a foreign matter, the particle is captured with the filter, and not only light diffusibility is deteriorated, but also industrial production becomes difficult due to filter choking. On the other hand, when a pore diameter of the filter is made to be coarse in order to avoid filter choking, a foreign matter which is to be an optical defect of a liquid crystal display is increased.

Examples of the thermoplastic resin incompatible with a polyester, which can be used as the light diffusion additive in the present invention, include the following materials.

(a) Polyolefin resin such as polyethylene, polypropylene, polymethylpentene, cyclic olefin etc.
(b) Polycarbonate resin
(c) Polystyrene resin such as atactic polystyrene, syndiotactic polystyrene, isotactic polystyrene etc.
(d) Polyamide resin
(e) Polyether resin
(f) Polyesteramide resin
(g) Polyphenylene sulfide resin
(h) Polyphenylene ether resin
(i) Polyether ester resin
(j) Polyvinyl chloride resin
(k) Acryl-based resin, a representative of which is polymethacrylic acid ester
(l) Copolymer containing any of (a) to (k) as a main component or a mixture of these resins It is preferable for producing the light diffusion film having a high light transmittance to use particularly an amorphous transparent polymer among them. To the contrary, when a crystalline polymer is used as the light diffusion additive, the crystalline polymer is clouded, an internal haze of the film becomes great, and a light transmittance may be reduced.

Examples of the amorphous transparent polymer usable in the present invention include a styrene-based resin such as a polystyrene resin, an acrylonitrile/styrene copolymer, a methyl methacrylate/styrene copolymer and the like, a cyclic olefin-based resin, an acryl-based resin, a representative of which is a methacrylic acid resin, and a polycarbonate resin. Among these amorphous transparent resins, a polystyrene resin or a styrene-based copolymer is particularly preferable.

A melt viscosity $\eta s$ of the polystyrene resin is preferably 1000 poise or higher, further preferably 3000 poise from a viewpoint that a distribution of a polystyrene resin phase in a dispersion particle is made to be uniform, and a phase structure of a dispersion particle is stabilized. On the other hand, a melt viscosity $\eta s$ of the polystyrene resin is preferably 10000 poise or lower, further preferably 7000 poise from a viewpoint that dispersibility in an extruder is improved, and a size of a dispersion particle is stabilized.

(2) Non-Melting Polymer Particle

A non-melting polymer particle usable as the light diffusion additive in the present invention is not limited as far as it is a particle which is not flowing-deformed due to melting when a temperature is raised from 30° C. to 350° C. at 10° C./min, using a melting point measuring device (Model MPA100, manufactured by Stanford Research Systems). Examples include an acryl-based resin, a polystyrene-based resin, a polyolefin-based resin, a polyester-based resin, a polyamide-based resin, a polyimide-based resin, a fluorine-based resin, a urea-based resin, a melamine resin, and an organic silicone-based resin. A shape of the particle is preferably spherical, particularly preferably pearl-like. And, the particle may or may not have a pore. Further, both of them may be used.

When the non-melting polymer particle consists of a polymer having a melting point of 350° C. or higher, a non-crosslinked polymer particle may be used, but from a viewpoint of heat resistance, it is preferable to use a crosslinked polymer particle consisting of a polymer having a crosslinked structure.

An average particle diameter of the non-melting polymer particle is preferably 0.5 to 50 µm. A lower limit of an average particle diameter of the non-melting polymer particle is more preferably 1.0 µm, particularly preferably 2.0 µm. When an average particle diameter of the non-melting polymer particle is less than 0.5 µm, it becomes difficult to obtain the good light diffusing effect.

On the other hand, an upper limit of an average particle diameter of the non-melting polymer particle is more preferably 30 µm, particularly preferably 20 µm. When an average particle diameter of the non-melting polymer particle is more than 50 µm, a film strength and a total light transmittance are easily reduced. It is preferable that, as the non-melting polymer particle, a particle having a particle size distribution which is as sharp as possible is used.

As the non-melting polymer particle, one kind or two or more kinds may be used. It is a preferable embodiment that a plurality of non-melting polymer particles having a sharp particle size distribution (meaning that a diameter of a particle is uniform), and having different average particle diameters are used together, because mixing therein of a coarse particle which becomes to be a defect of a film can be suppressed.

The average particle diameter of a particle is measured by the following method.

A particle is photographed with a scanning electron microscope (SEM), a maximum diameter of 360 to 500 particles is measured at such magnification that a size of one smallest particle is 2 to 5 mm, and an average thereof is adopted as an average particle diameter. And, when particles contained in a film are present alone, a maximum diameter of individual particles is measured, and an average thereof is adopted as an average particle diameter.

(3) Inorganic Particle

Examples of the inorganic particle usable as the light diffusion additive include silica, calcium carbonate, barium sulfate, calcium sulfate, alumina, kaolinite, talc and the like.

An average particle diameter of the inorganic particle is such that a lower limit is preferably 0.1 µm, further preferably 0.5 µm, particularly preferably 1 µm from a viewpoint of obtaining the good light diffusing effect.

On the other hand, an average particle diameter of the inorganic particle is such that an upper limit is preferably 50 µm, further preferably 30 µm, particularly preferably 20 µm from a viewpoint of suppression of reduction in a film strength.

It is preferable that a particle size distribution of the inorganic particle is as sharp as possible. When it is necessary to widen a particle size distribution, it is preferable that particles which have a sharp particle size distribution and different average particle diameters are used together in order to suppress mixing therein of a coarse particle which becomes to be a defect of a film.

A shape of the inorganic particle is not limited, but is preferably substantially spherical or pearl-like. And, the particle may be either of non-porous or porous type. Further, both of them may be used.

As the light diffusion additive, among above three kinds, one kind, or two or more kinds may be used.

(4) Mixing Ratio of Light Diffusion Additive

A light diffusion layer in the light diffusion film of the present invention consists of a composition comprising 60 to 98 parts by mass of a crystalline polyester, and 2 to 40 parts by mass of a light diffusion additive incompatible with the polyester.

And, when a mixing ratio of the light diffusion additive is less than 2 parts by mass, the light diffusion performance is deficient. On the other hand, a mixing ratio of the light diffusion additive is more than 40 parts by mass, the number and a size of voids generated around the light diffusion additive are increased, and an internal haze becomes great, and a total light transmittance tends to be reduced. In addition, since a composition of a light diffusion layer and that of a supporting layer are considerably different, there is a tendency that a film is easily curled. Further, since at biaxial stretching of a film, the light diffusion additive is easily detached, and the detached matter becomes a cause for a foreign matter, this is not preferable also from this point of view.

Since a mixing ratio of the light diffusion additive is different in an appropriate range depending on a material used, the ratio is adjusted in the aforementioned range so that a total light transmittance becomes 85% or more and a haze becomes 30% or more. Adjustment of an incorporation ratio is a design matter which can be adjusted by performing a preliminary experiment, and undue trial and error is not necessary.

(Layer Construction)

It is important that the light diffusion film of the present invention consists of a multilayer structure in which (B) a light diffusion layer consisting of a blend composition of the crystalline polyester and the light diffusion additive incompatible with the crystalline polyester is laminated on at least one side of (A) a supporting layer consisting of the crystalline polyester by a co-extrusion method. And, by adopting such the multilayer structure, a light diffusion film having a high haze and a high total light transmittance can be obtained. That is, a high total light transmittance can be attained by suppressing light diffusion inside a film (internal haze) and, at the same time, a high haze can be attained by effectively utilizing the light diffusing effect generated by irregularities on a surface of (B) the light diffusion layer (surface haze).

A layer construction of the light diffusion film of the present invention may be of a construction of two layers as described above, or may be of a multilayer construction of three of more layers, if necessary.

When the light diffusion film of the present invention is used as a light diffusion sheet of an underside of a prism sheet (condensing sheet), since the light diffusing effect generated by surface irregularities can be obtained on both sides of a film by co-extrusion-laminating (B) the light diffusion layer on both sides of (A) the supporting layer, a light diffusion film having a further high haze while maintaining a high light transmittance can be obtained.

In addition, when the light diffusion film of the present invention is used as a light diffusion sheet of an upper surface of a prism sheet (condensing sheet), since a surface opposite to a prism sheet (condensing sheet) is required to have smoothness, such a construction may be adopted that (B) the light diffusion layer is provided on one side of (A) the supporting layer.

In addition, in order to prism-processing the light diffusion film of the present invention to try integration of the light diffusion film and the prism sheet (condensing sheet), as a construction that (B) the light diffusion layer is provided on one side of (A) the supporting layer, prism-processing of a surface of (A) the supporting layer, which is a smooth surface of the construction, is a preferable embodiment because characteristics possessed by the light diffusion film of the present invention can be effectively utilized.

Alternatively, a layer having the function other than that of (A) the supporting layer, or (B) the light diffusion layer may be laminated by co-extrusion. Particularly, in order to prevent the light diffusion additive contained in (B) the light diffusion layer from bleeding out or dropping off to a film surface, to produce a light diffusion film having no defect, it is effective to co-extrusion-mold (C) a protective layer on a surface of (B) the light diffusion layer. In this case, it is required that the light diffusion additive is not incorporated into (C) the protective layer, or when incorporated, an incorporation ratio is less than that into (B) the light diffusion layer.

As a main raw material of (C) the protective layer, a crystalline polyester may be used, or a low crystalline polyester having a melting point of lower than 250° C., or an amorphous polyester for which a clear crystal melting heat peak (melting point) is not observed may be used.

A thickness of (B) the light diffusion layer in the present invention is such that a lower limit is preferably 3 μm, further preferably 50 μm in order to render a laminate structure of a film uniform, and uniformize light diffusibility. On the other hand, a thickness of (B) the light diffusion layer is such that an upper limit is preferably 70 μm, further preferably 50 μm in order to increase a surface haze and suppress reduction in a total light transmittance due to increase in an internal haze.

A ratio of the light diffusion layer relative to a total film thickness is preferably 3 to 50%, further preferably 4 to 40%, most preferably 5 to 30%. When a ratio of the light diffusion layer relative to a total film thickness is less than 3%, a laminate structure of a film becomes ununiform, and light diffusibility becomes ununiform, being not preferable.

On the other hand, when a ratio of (B) the light diffusion layer relative to a total film thickness is more than 50%, curling derived from a thermal or mechanical property difference between (A) the supporting layer and (B) the light diffusion layer is easily generated, being not preferable. Further, unnecessary increase in a ratio of the light diffusion layer relative to a total film thickness is not preferable also in that it results in a factor of reducing smoothness of a surface of (A) the supporting layer.

In addition, when (C) the protective layer is provided, it is preferable that a thickness of (C) the protective layer is smaller than a thickness of the light diffusion layer. In addition, when a low crystalline polyester having a melting point of lower than 250° C., or an amorphous polyester is used as a raw material of (C) the protective layer, a thickness of (C) the protective layer is preferably less than 20 μm, further preferably less than 10 μm.

(Property of Light Diffusion Film)

It is important that the light diffusion film of the present invention has a planar orientation degree (ΔP) of 0.080 to 0.160, and a total light transmittance of 85% or more, and a haze of 30% or more.

A lower limit of a planar orientation degree (ΔP) is more preferably 0.100, further preferably 0.110. On the other hand, an upper limit of a planar orientation degree (ΔP) is more preferably 0.150, further preferably 0.140. When a planar orientation degree (ΔP) is more than 0.160, a surface of (B) the light diffusion layer is reduced in irregularities (flattened), and the light diffusing effect generated by surface irregularities (surface haze) is remarkably reduced. And, when a planar orientation degree (ΔP) is more than 0.160, the number and a size of voids generated around the light diffusion additive are increased, and an internal haze is increased. For this reason, a total light transmittance tends to be reduced. In any event, when a planar orientation degree (ΔP) is more than 0.160, a total light transmittance and light diffusibility can not be balanced, being not preferable.

Examples of a method of decreasing a planar orientation degree of a film include (1) a method of decreasing a stretching stress at biaxial stretching, and (2) a method of relaxing a stress remaining in a film after biaxial stretching. Examples of the former method (1) include (a) a method of decreasing a stretching ratio, (b) a method of raising a stretching temperature, (C) a method of slowing a stretching rate, and (d) a method of jointly using a copolymerized polyester as a raw material of a film. Examples of the latter method (2) include a method of raising a thermal fixing temperature above a normal thermal fixing temperature. A planar orientation degree of a film is adjusted using these methods alone or in combination thereof.

On the other hand, when a planar orientation degree is less than 0.080, the characteristics as the biaxially stretched film are lost, and a mechanical strength is remarkably reduced, being not preferable. In addition, uniformity of a film thickness is deteriorated.

Therefore, in the present invention, a method of controlling a planar orientation degree by completing all stretchings from stretching initiation to stretching termination in a longitudinal direction and a transverse direction at a slow stretching rate of less than 80%/sec is preferable from a viewpoint of balance between a total light transmittance and light diffusibility, and heat resistance, mechanical strength and thickness accuracy possessed by the biaxially stretched polyester film.

A lower limit of a total light transmittance in the light diffusion film of the present invention is preferably 86%, more preferably 88%, further preferably 89%, most preferably 90%. On the other hand, a preferable upper limit of a total light transmittance is 98%.

In addition, a lower limit of a haze in the light diffusion film of the present invention is preferably 40%, further preferably 50%, most preferably 60%. On the other hand, a preferable upper limit is 100%.

Further, in the present invention, a surface haze which is a difference between the aforementioned haze and an internal haze obtained by the following method is preferably 20% or more. The surface haze is more preferably 30% or more, further preferably 40% or more. A preferable upper limit of a surface haze is 100%.

(Assessment of Internal Haze)

A value obtained by subtracting a haze measured by the aforementioned normal method (one film haze) from a haze measured by stacking two films via a cedar oil (two film haze) is adopted as an internal haze.

The surface haze is imparted by irregularities of a surface of the light diffusion layer, and is imparted by light scattering generated when light is emitted from a film surface, or light enters a film surface. Therefore, a surface haze and a total light transmittance have fundamentally no relationship, and a haze can be increased by increasing a surface haze while reduction in a total light transmittance is suppressed.

On the other hand, an internal haze is imparted by light scattering inside a film, and since back scattering of incident light is generated, a total light transmittance is reduced. Therefore, in order to produce a light diffusion film having a high haze and a high total light transmittance, it is an effective means to increase a surface haze and, at the same time, decrease an internal haze as much as possible.

And, an internal haze in the present invention is preferably 12% or less, more preferably 10% or less, most preferably 5% or less. In addition, a preferable lower limit of an internal haze is 0.1%, and a further preferable lower limit is 1%. In order to render an internal haze 0.1% or less, the light diffusion additive can be added only to a vicinity of a film superficial layer and, therefore, there is a possibility that light diffusibility becomes ununiform.

Then, heat resistance, mechanical strength and thickness accuracy of the light diffusion film of the present invention will be explained. The following properties are for illustrating the effect obtained as a result of the present invention, without limiting the present invention.

In the light diffusion film of the present invention, in order to overcome deterioration of remarkable dimensional change or planarity in processing at a high temperature or use under high temperature environment, and to attain the original object of the light diffusion film that a luminance of a light emitting surface at a back light unit is rendered uniform, a dimensional change rate at 150° C. is preferably 3% or less, more preferably 2% or less, further preferably 1.0% or less, most preferably 0.5% or less.

In addition, in the light diffusion film of the present invention, in order to render a mechanical strength of a biaxially stretched film sufficient, and suppress disadvantage such as cracking, breaking, bending at a step of processing a film, a tensile strength is preferably 100 MPa or more both in a longitudinal direction and a transverse direction. A lower limit of a tensile strength is preferably 110 MPa, further preferably 140 MPa, particularly preferably 150 MPa.

In addition, in the light diffusion film of the present invention, in order to prevent reduction in planarity due to wrinkle or lump when the film is wound up on a roll, and render a luminance of a light emitting surface at a back light unit uniform, a thickness variation measured by the following method is preferably 10% or less. A thickness variation is more preferably 5.0% or less, further preferably 4.0% or less. The thickness variation is desirably smaller, but since rendering the thickness variation 0.1% or less is technically very difficult, and a great difference in practical quality is not seen, a lower limit of the thickness variation may be 0.1%.

[Assessment of Thickness Variation]

A tape-like sample (length 1 m) which is continuous in a longitudinal direction is taken, and an electronic micrometer (Millitron 1240, manufactured by Seiko EM) is used to measure a thickness of 100 samples at a pitch of 1 cm. From measured values, a maximum (dmax), a minimum (dmin), and an average (d) of a thickness were obtained, and a thickness variation (%) was calculated by the following equation. Measurement was performed three times, and an average was obtained.

$$\text{Thickness variation (\%)} = ((d\text{max} - d\text{min})/d) \times 100$$

In addition, in the light diffusion film of the present invention, for the following reasons (A) and (B), a curling value after heat treatment at 100° C. for 30 minutes under no lead is preferably 20 mm or less, more preferably 10 mm or less, further preferably 5 mm or less, most preferably 2 mm or less.

(a) For example, deterioration of handling property at working under no tension when incorporated into a final product as the light diffusion film can be prevented.

(b) In addition, in processing at a high temperature, and use under high temperature environment, generation of a strain of the light diffusion film is suppressed, and a luminance of a light emitting surface at a back light unit is rendered uniform.

Regarding curling suppression, in the present invention, both of the supporting layer (A) and the light diffusion layer (B) use a crystalline polyester, and curling is suppressed, and it is preferable to use the same kind of polyester in both layers.

Further, in order to control curling due to a difference in a structure between a surface and a back of the film which is imparted at each step such as pre-heating, stretching, cooling, winding and the like, including a crystallization degree in a film thickness direction due to a difference in a cooling rate between surface cooling and back cooling at extrusion, it is preferable to apply a method of positively generating a difference in a structure between a surface and a back, and complementing an inevitable difference in a structure to make a curling value approach zero.

Specifically, regarding curling in a longitudinal direction immediately after film making, a stretching temperature of a surface and a back of the film at longitudinal stretching may be controlled. In a surface which has been stretched at a lower temperature, molecular orientation of a polyester is strengthened than an opposite surface. For this reason, a linear expansion coefficient of the film is reduced. By utilizing this behavior, a linear expansion coefficient of a surface and a back of the film can be controlled, thereby, curling in a longitudinal direction can be controlled.

In addition, curling in a transverse direction can be similarly controlled by separately controlling a stretching temperature of a surface and that of a back at transverse stretching.

(Production of Biaxially Stretched Film)

In the present invention, a method of imparting the aforementioned properties to the light diffusion film is not particularly limited, but implementation by the following method is a preferable aspect.

In the process for producing the light diffusion film of the present invention, it is the greatest characteristic that, in a process for making a film using the crystalline polyester as a constituent component, and at a stretching ratio which is conducted in producing a normal polyester film, by which a film having a high accuracy film is obtained, formation of voids generated around the light diffusion additive at stretching is suppressed and, at the same time, sufficient irregularities are formed on a surface of the light diffusion layer, thereby, the light diffusion film having the aforementioned properties is obtained, In order to attain the object, it is important that biaxial stretching of the film is performed under specific stretching condition, particularly at a slow stretching rate both in a longitudinal direction and a transverse direction.

Regarding a preferable process for producing the light diffusion film of the present invention, a representative example using a pellet of polyethylene terephthalate (hereinafter, referred to as PET) as a crystal polyester which is a raw material of the light diffusion layer (B) will be described in detail below, being not naturally limiting.

When the pellet is transferred, it is usually transferred with the air using a predetermined piping and, thereupon, in order to prevent mixing of a dust into the air, it is preferable to use the air which has been cleaned using a HEPA filter. It is preferable to use, as the HEPA filter used thereupon, a filter of a nominal filtration accuracy of 0.5 μm or more having the ability to cut 95% or more of a dust.

First, a polyester and a thermoplastic resin incompatible with the polyester are dried to a moisture content of less than 110 ppm by vacuum drying or hot air drying. Then, respective raw materials are weighed, mixed and supplied to an extruder, and this is melt-extruded into a sheet. Further, the sheet in the molten state is adhered to a metal rotating roll (chill roll) controlled at a surface temperature of 10 to 50° C. using an electrostatic application method and, further, the cool air is blown from an opposite surface to cool and solidity it to obtain an unstretched PET sheet.

Thereupon, in order to suppress generation of a foreign matter such as a deteriorated matter and the like, it is preferable to control a resin temperature of a melting part, a kneading part, a polyester tube, a gear pump, and up to a filter at 280 to 290° C., and a resin temperature of, thereafter, a polymer tube, and up to a die at 270 to 295° C.

In addition, in order to remove a foreign matter contained in a resin at an arbitrary place where a melt resin is retained at about 280° C., high accuracy filtration is performed. A filtering material used in high accuracy filtration of a melt resin is not particularly limited, but in the case of a filtering material of a sintered stainless, the ability to remove an aggregate containing Si, Ti, Sb, Ge and Cu as a main component and a high melting point organic substance is excellent, being suitable. For performing high accuracy filtration, when a temperature of a melt resin is lower than 280° C., since a filtration pressure is raised, a response such as reduction in an amount of a raw material resin to be extruded becomes necessary, reducing productivity.

Further, a filtration particle size (initial filtration efficacy 95%) of the filtering material is preferably 20 μm or less, particularly preferably 15 μm or less. When a filtration particle size (initial filtration efficacy 95%) of the filtering material is more than 20 μm, a foreign matter having a size of 20 μm or more can not be sufficiently removed. By performing high accuracy filtration using the filtration material having a filtration particle size (initial filtration efficacy 95%) of 20 μm or less, productivity is reduced in some cases, but this is an important step for obtaining a film having little optical defect due to a coarse particle. In the present invention, the aforementioned high accuracy filtration becomes possible by using the thermoplastic resin incompatible with a polyester as the light diffusibility manifesting material.

In order to co-extrude to laminate the light diffusion layer (B) and the supporting layer (A), raw materials of each layers are extruded using two or more extruders, both layers are joined using a multilayer feed block (e.g., joining block having a square-type joining part), extruded through a slit-like die into a sheet, and cooled and solidified on a casting roll to make an unstretched film. Alternatively, a multimanifold die may be used in stead of using the multilayer feed back.

In addition, the light diffusion film of the present invention has preferably a coated layer on at least one surface and, further, may have a coated layer on both surfaces. A preferable coating amount is in a range of 0.005 to 0.20/m². By providing a coated layer on a film surface, generation of reflected light on a film surface can be suppressed to further enhance a total light transmittance. In addition, when a surface opposite to the light diffusion layer is subjected to prism processing or hard coating processing, easy adherability may be imparted.

In this case, after a coated layer is provided on an unstretched film obtained by the aforementioned method, biaxial stretching is performed simultaneously. In addition, when stretching is performed by a successive stretching method, after an easily adhering layer is provided on a film which has been monoaxially stretched in a longitudinal or transverse direction, stretching is performed in an orthogonal direction, thereby, biaxial stretching is performed.

A method of coating a coating solution for forming a coated layer on an unstretched film or a monoaxially stretched film can be selected from the known arbitrary methods, and examples include a reverse roll coating method, a gravure coating method, a kiss coating method, a die coater method, a roll brushing method, a spray coating method, an air knife coating method, a wire bar coating method, a pipe doctor method, an impregnation coating method, and a curtain coating method. Coating is performed by these methods alone, or by combining those methods.

It is preferable that a resin constituting a coating layer contains, as a main component, one or more kinds selected from the group consisting of a copolymerized polyester resin, a polyurethane-based polymer and an acryl-based resin from a viewpoint that more excellent adherability with other member is maintained in light diffusion film utility. These resins are also recommended from a viewpoint of suppression of generation of reflected light on a film surface. The "main component" in the easily adhering layer means that at least one kind of the above-listed resins is 50% by mass or more in 100% by mass of resins constituting the layer.

When no particle is contained in the supporting layer (A) in order to enhance transparency of the film, or the particle is contained at a small amount so as not to suppress transparency, easy slidability of the film becomes insufficient, and handling property is deteriorated in some cases. For this reason, a particle for the purpose of imparting easy slidability may be added to the coated layer. For these particles, it is important to use a particle having an extremely small average particle diameter which is not larger than a wavelength of visible light in order to retain transparency.

Examples of the particle include inorganic particles such as calcium carbonate, calcium phosphate, silica, kaolin, talc, titanium dioxide, alumina, barium sulfate, calcium fluoride, lithium fluoride, zeolite, and molybdenum sulfide; crosslinked polymer particles; organic particles such as calcium oxalate. When the coating layer is formed mainly of the copolymerized polyester resin, silica is particularly preferable. Silica is most suitable in that a light diffusion film more excellent in transparency can be obtained since a refractive index of silica is relatively close to that of a polyester.

It is preferable from a viewpoint of maintenance of transparency, handling property, and anti-scratching property of the light diffusion film that the particle to be contained in a coating layer has an average particle diameter (particle diameter observed by SEM) of 0.005 to 1.0 μm. An upper limit of an average particle diameter of the particle is further preferably 0.5 μm, particularly preferably 0.2 μm from a viewpoint of transparency. A lower limit of an average particle diameter of the particle is further preferably 0.03 μm from a viewpoint of handling property and anti-scratching property.

An average particle diameter of the particle is measured by the following method.

A particle is photographed with a scanning electron microscope (SEM), a maximum diameter of 300 to 500 particles is measured at such magnification that a size of one smallest particle becomes 2 to 5 mm, and an average thereof is adopted as an average particle diameter. In addition, when an average particle diameter of a particle to be contained in the coated layer is obtained, a cross-section of a coating film is photographed using a transmission electron microscope (TEM) at such magnification that a size of one smallest particle becomes 2 to 5 mm, and a maximum diameter of a particle present in a cross-section of a coated layer is obtained. An average particle diameter of a particle consisting of an aggregate is obtained by photographing 300 to 500 particles on a cross-section of a coated layer of a coated film using a light microscope at magnification of ×200, and a maximum diameter thereof is measured.

It is preferable from a viewpoint of maintenance of transparency, adherability, handling property, and anti-scratching property of a laminated film for optics that a content of a particle in the coated layer is 0.1 to 60% by mass based on a total amount of constituent components of the coated layer. An upper limit of a content of a particle is further preferably 5% by mass, particularly preferably 40% by mass from a viewpoint of transparency and adherability. In addition, a lower limit of a content of a particle is further preferably 1% by mass from a viewpoint of handling property and anti-scratching property.

Two or more kinds of the particles may be used together, or the same kind of particles having different particle diameters may be blended. In any event, it is preferable that an average particle diameter of total particles, and a sum content satisfy the aforementioned ranges.

Then, the unstretched film obtained by the aforementioned method is simultaneously biaxially stretched or successively biaxially stretched and, then, heat-treated.

It is important that the biaxial stretching is performed at a stretching ratio of 2.8 or more in both longitudinal and transverse directions. A stretching ratio as defined in the present invention is an actual stretching ratio at which a film has been actually stretched. This stretching ratio can be grasped by a mass change rate per unit area before and after each stretching step, or drawing a lattice-like ratio marker on an unstretched film. When a stretching ratio in an either longitudinal or transverse direction is less than 2.8, excellent heat resistance and mechanical strength which are intrinsic to a biaxially stretched film are not obtained. In addition, thickness uniformity of a film is remarkably deteriorated. A preferable lower limit of a stretching ratio in the present invention is 2.9, and a more preferable lower limit is 3.1. A preferable upper limit of a stretching ratio is 6.0.

In addition, biaxial stretching in the present invention is particularly importantly such that stretching is performed at a stretching rate of less than 80%/sec, more preferably at a stretching rate of less than 50%/sec in both longitudinal direction and transverse directions. The stretching rate in the present invention is such that a change rate of a film per unit time is expressed based on a dimension of an unstretched film, and a stretching rate in a longitudinal direction and a stretching rate in a transverse direction (unit:%/sec) are defined by the following equations, respectively.

Stretching in longitudinal direction (%/sec)=acceleration at film running (m/sec/sec)÷rate of unstretched film (m/sec)×100

Stretching rate in transverse direction (%/sec)=width change rate per second (m/sec)÷width (m) of unstretched film (m)×100

And, all stretching from stretching initiation to stretching completion in a longitudinal direction and a transverse direction is completed at a stretching rate of less than 80%/sec. By this, it first becomes possible to industrially stably produce a product of an orientation degree of a film of 0.160 or less while a crystalline polyester is used as a matrix polymer. As a result, it becomes possible to produce a light diffusion biaxially stretched film which has a high total light transmittance, is excellent in light diffusibility, and has heat resistance and mechanical strength intrinsic to a biaxially stretched polyester film, at an excellent thickness accuracy.

On the other hand, a lower limit of a stretching rate is not limited, but when a stretching rate is slowed than required, productivity of a film is reduced in production of a film at an industrial scale, or an excess facility investment becomes necessary. Therefore, in the present invention, a maximum stretching rate from stretching initiation to initiation completion is preferably 5%/sec or more, further preferably 10%/sec or more.

In a generally performed successive biaxial stretching method, a roll format stretching machine is used in stretching in a longitudinal direction. However, in a roll format stretching, a stretching rate is extremely high, and it becomes difficult to obtain the effect of the present invention.

As a biaxial stretching machine which can control a stretching rate at the aforementioned stretching rate in a longitudinal direction and in a transverse direction, a tenter system simultaneous biaxial stretching machine provided with a mechanism by which the film can be continuously stretched in both longitudinal and transverse directions by guiding a film in the state where both ends of the film are grasped with clips, and controlling a width between clips and a conveying rate of clips, is preferable. The clip conveying mechanism is arbitrary and is not particularly limited as far as the facility is a facility having the relevant function, but the previously known device such as a pantagraph system, a linear motor system, a screw system and the like can be adopted.

In addition, upon biaxial stretching of a film, detailed conditions such as a stretching temperature, a heat treating temperature, a time and the like can be arbitrarily selected depending on properties of a matrix polymer and properties which are required that a film has, for example, optical properties such as a refractive index and the like, mechanical properties, thermal properties such as a dimensional change rate, a desired crystallization degree, and the like, without any limitation.

In this respect, when PET is used as a matrix polymer, and a simultaneous biaxial stretching machine is used in biaxial stretching of a film, a preferable stretching temperature is 95° C. to 110° C. When a stretching temperature (maximum temperature) is higher than 110° C., it becomes difficult to control a planar orientation degree of a film at 0.080 or more. Further, uniformity such as a film thickness accuracy and the like is reduced. On the other hand, a stretching temperature (highest temperature) is lower than 95° C., it becomes difficult to uniformly control a planar orientation degree of a film at 0.160 or less.

In addition, a film heat treating temperature is preferably in a range of 200° C. or higher and 250° C. or lower, and a heat treating time is preferably in a range of 10 seconds or longer and 100 seconds or shorter. Relaxing treatment in a longitudinal direction and/or a transverse direction may be performed simultaneously with heat treatment or after heat treatment.

EXAMPLES

Then, the effect of the present invention will be explained using Examples and Comparative Examples. First, a method of assessing property values used in the present invention will be shown below.
[Assessing Method]
(1) Inherent Viscosity of Polyester Resin.

According to JIS K 7637-5, a viscosity was measured at 30° C. using a mixed solvent of phenol (60% mass %) and 1,1,2,2-tetrachloroethane (40 mass %) as a solvent.
(2) Crystal Melting Heat Amount and Melting Point They are obtained using a differential scanning calorimeter (Model DSC3220, manufactured by SII NanoTechnology Inc.). A sample is heated to melt at 300° C. for 5 minutes under nitrogen atmosphere, and rapidly cooled with liquid nitrogen. Then, a temperature of 10 mg of the sample is raised at a rate of 20° C./min. From the resulting DSC curve, melting heat was obtained from an area of an endothermic peak accompanied with crystal melting, and this was divided by a mass of the sample to calculate a crystal melting heat amount. And, an apex of the endothermic peak was adopted as a melting point.
(3) Melt Viscosity A melt viscosity at a resin temperature of 285° C. and a shearing rate of 100/sec was measured using a flow tester (CFT-500, manufactured by SHIMADSU CORPORATION). Since it is difficult to measure a melt viscosity at a shearing rate of 100/sec by fixing a shearing rate at 100/sec, a melt viscosity was measured at an arbitrary shearing rate of less than 100/sec and at an arbitrary shearing rate greater than the rate, a melt viscosity was taken on an ordinate axis, and a shearing rate was taken on an abscissa axis, and these were plotted on a bilogarithmic graph. The above two points were connected with a straight line, and a melt viscosity (unit: poise) at a shearing rate of 100/sec was obtained by interpolation.

(4) Variation in Film Thickness

A tape sample (length 1 m) which is continuous in a longitudinal stretching direction is taken, and a thickness at 100 places is measured at a pitch of 1 cm using Millitron 1240, manufactured by Seiko EM. From measured values, a maximum (dmex), a minimum (dmin) and an average (d) of a thickness were obtained, and a thickness variation (%) was calculated by the following equation. Measurement was performed three times, and an average thereof was obtained.

Thickness variation (%)=((dmax−dmin)/d)×100

(5) Haze, Total Light Transmittance

They were measured according to JIS K 7105 "Method of testing optical properties of plastics" Haze (Haze value). As a measuring device, a turbidity meter, Model NDH-300A manufactured by NIPPON DENSHOKU INDUSTRIES CO., LTD. was used.

In the case of a film in which the light diffusion layer (B) is laminated on only one side, they were measured by arranging a surface of the supporting layer (A) on an incident light side, and arranging a surface of the light diffusion layer (B) on a light emitting side.

(6) Internal Haze, Surface Haze

[Method of Assessing Internal Haze]

A value obtained by subtracting a haze measured by a normal method (one film haze) from a haze measured by stacking two films via a cedar oil therebetween (two films haze) was adopted as an internal haze.

In addition, a value obtained by subtracting the internal haze obtained by the aforementioned method from a haze measured by a normal method (one film haze) was adopted as a surface haze.

In the case of a film having an asymmetrical structure between a surface an a back such as a film in which the light diffusion layer (B) is laminated on only one side, and the like, it is necessary to measure a haze by stacking the light diffusion layer (B) and the supporting layer (A) of each film via a cedar oil. Also in this case, a haze was measured by arranging a surface of the supporting layer (A) on an incident light side, and arranging a surface of the light diffusion layer (B) on a light emitting side.

(7) Tensile Strength

A tensile strength was measured according to JIS C 2318-1997 5.3.3 (tensile strength and elongation rate).

(8) Dimensional Change Rate

A dimensional change rate was measured according to JIC C 2318-1997 5.3.4 (dimensional change).

(9) Planar Orientation Degree (ΔP)

A refractive index (nx) in a longitudinal direction of a film, a refractive index (ny) in a width direction, and a refractive index (nz) in a thickness direction were measured with an Abbe refractomer using a sodium D ray as a light source according to JIS K 7142-1996 5.1 (A Method), and a planar orientation degree (ΔP) was calculated by the following equation.

ΔP={(nx+ny)−2nz}÷2

(10) Curling Value

A film was excised into a leaf, 100 mm in a longitudinal direction and 100 mm in a width direction, heat-treated at 100° C. for 30 minutes under no load state, and stood on a horizontal glass plate with a convex part of a film down. Then, a vertical distance between the glass plate and a lower end of each of four corners of a stood up film was measured with a ruler. A maximum among measured values of four places was adopted as a curling value. Three samples were prepared, measurement was repeated, and an average thereof was adopted as a curling value. When curling was 1 mm or less, curling was measured at an accuracy of 0.5 mm and, when curling is more than 1 mm, curling was measured at an accuracy of 1 mm.

Example 1

(1) Production of PET Resin (M1)

A temperature of an esterification reaction can was raised and, when a temperature reached 200° C., a slurry consisting of 86.4 parts by mass of terephthalic acid and 64.4 parts by mass of ethylene glycol was placed therein, and 0.017 part by mass of antimony trioxide and 0.016 part by mass of triethylamine as a catalyst were added while stirring. Then, a temperature was raised under pressure, and an esterification reaction under pressure was performed under the condition of a gauge pressure of 3.5 kgf/cm$^2$ and 240° C. Thereafter, the interior of the esterification reaction can was returned to a normal pressure, and 0.071 part by mass of magnesium acetate tetrahydrate and, then, 0.014 part by mass of trimethyl phosphate were added. Further, a temperature was raised to 260° C. over 15 minutes, 0.012 part by mass of trimethyl phosphate and, then, 0.0036 part by mass of sodium acetate were added. After 15 minutes, the resulting esterification reaction product was transferred to a polycondensation reaction can, a temperature was gradually raised from 260° C. to 280° C. under reduced pressure, and a polycondensation reaction was performed at 285° C.

After completion of the polycondensation reaction, the reaction product was filtration-treated with a filter produced by NASLON having a 95% cut diameter of 5 μm, extruded through a nozzle into a strand, cooled and solidified using pre-filtration-treated (pore diameter: 1 μm or less) cooling water, and cut into a pellet. The resulting PET resin (M1) had a crystal melting heat of 35 mJ/mg, a melting point of 256° C., an inherent viscosity of 0.616 dl/g, a Sb content of 144 ppm, a Mg content of 58 ppm, a P amount of 40 ppm, a color L value of 56.2, and a color b value of 1.6, and did not substantially contain inert particles and internally precipitated particles.

(2) Production of Polystyrene Master Batch (M2)

Thirty parts by mass of a polystyrene resin (PS) (G797N manufactured by Japan Polystyrene Inc.) having a melt viscosity of 3900 poise, and 70 parts by mass of the PET (M1) were pellet-mixed, supplied to a vent format biaxial extruder, kneaded, and melt-extruded, and the resulting strand was cooled, and cut to prepare a polystyrene master batch (M2).

(3) Preparation of Coating Solution (M3)

A reaction container was charged with 95 parts by mass of dimethyl terephthalate, 95 parts by mass of dimethyl isophthalate, 35 parts by mass of ethylene glycol, 145 parts by mass of neopentyl glycol, 0.1 part by mass of zinc acetate, and 0.1 part by mass of antimony trioxide, and a transesterification reaction was performed at 180° C. over 3 hours. Then, 6.0 parts by mass of sodium 5-sulfoisophthalate was added, an esterification reaction was performed at 240° C. over 1 hour, and a polycondensation reaction was performed at 250° C.

over 2 hours under reduced pressure (10 to 0.2 mmHg) to obtain a copolymerized polyester-based resin having a number average molecular weight of 19,500 and a softening point of 60° C.

A 30 mass % aqueous suspension (7.5 parts by mass) of the resulting copolymerized polyester-based resin, 11.3 parts by mass of a 20 mass % aqueous solution of a self-crosslinking-type polyurethane-based resin containing an isocyanate group blocked with sodium bisulfite (Elastron H-3 manufactured by DAI-ICHI KOGYO SEIYAKU, CO., LTD.), 0.3 part by mass of a catalyst for Elastron H-3 (Cat64, manufactured by DAI-ICHI KOGYO SEIYAKU, CO., LTD.), 39.8 parts by mass of water, and 37.4 parts by mass of isopropyl alcohol were mixed.

Further, 0.6 part by mass of a 10 mass % aqueous solution of a fluorine-based nonionic surfactant (Megafac F142D manufactured by Dainippon Ink and Chemicals, Inc.), 2.3 parts by mass of a 20 mass % aqueous suspension of colloidal silica (Snowtex OL, manufactured by Nissan Chemical Industries, Ltd.; average particle diameter 40 nm) as a particle A, and 0.5 part by mass of a 3.5 mass % aqueous suspension of a dry process silica (Aerosil OX50, manufactured by Nippon Aerosil Co., Ltd., average particle diameter 200 nm, average primary particle diameter 40 nm) as a particle B were added. Then, a pH of a coating solution was adjusted to 6.2 with a 5 mass % aqueous sodium bicarbonate solution, and precision-filtered with a felt-type polypropylene filter having a filtration particle size (initial filtration efficacy: 95%) of 10 μm to prepare a coating solution (M3).

(4) Production of Light Diffusion Film

After 67 parts by mass of PET (M1) and 33 parts by mass of a polystyrene master batch (M2) as a raw material of the light diffusion layer (B) were dried at 135° C. for 6 hours under reduced pressure (1 Torr), they were mixed, and supplied to an extruder 2. Separately, PET (M1) as a raw material of the supporting layer (A) was dried at 135° C. for 6 hours under reduced pressure (1 Torr), and supplied to an extruder 1. Respective raw materials supplied to the extruder 2 and the extruder 1 were set so that a resin temperature at a melting part, a kneading part, a polymer tube, a gear pump, and up to a filter of the extruder was 280° C. and a resin temperature at a polymer tube thereafter was 275° C., and those raw materials were laminated using a two-layers joining block, and melt-extruded through a die into a sheet. A ratio of a thickness of the (A) layer and that of the (B) layer was controlled at 80:20 using a gear pump for each layer. And, a filtering material (filtration accuracy: 10 μm particle 95% cut) of a sintered stainless was used for the filter. A temperature of the die was controlled so that an extruded resin temperature became 75° C.

Then, the extruded resin was cast on a cooling drum at a surface temperature of 30° C., and cooled to solidify while adhered to a surface of the cooling drum using an electrostatic application method, to make an unstretched film having a thickness of about 1.2 mm. Thereupon, the (B) layer surface was adopted as a surface contacting with the cooling drum.

Then, an easily adhering layer was coated on one side (A) of the resulting unstretched film. A coating solution obtained by precision-filtering the coating solution (M3) with a felt-type polypropylene filtering material of a filtration particle size of 5 μm (initial filtration efficacy 95%) was used. In addition, as a coating method, a reverse roll method was adopted, and coating was performed at a wet coating amount of about 20 g/m². Thereafter, a coated surface was dried in a drying furnace having two separate zones at a first zone temperature of 100° C. and a wind speed of 20 m/sec for 10 seconds, and at a second zone temperature of 70° C. and a wind speed of 20 m/sec for 10 seconds.

Then, the film was guided to a simultaneous biaxial stretching machine while both ends of the unstretched film having the coated layer were grasped with clips, and a biaxially stretched film was made under the following condition.

Figure 1:
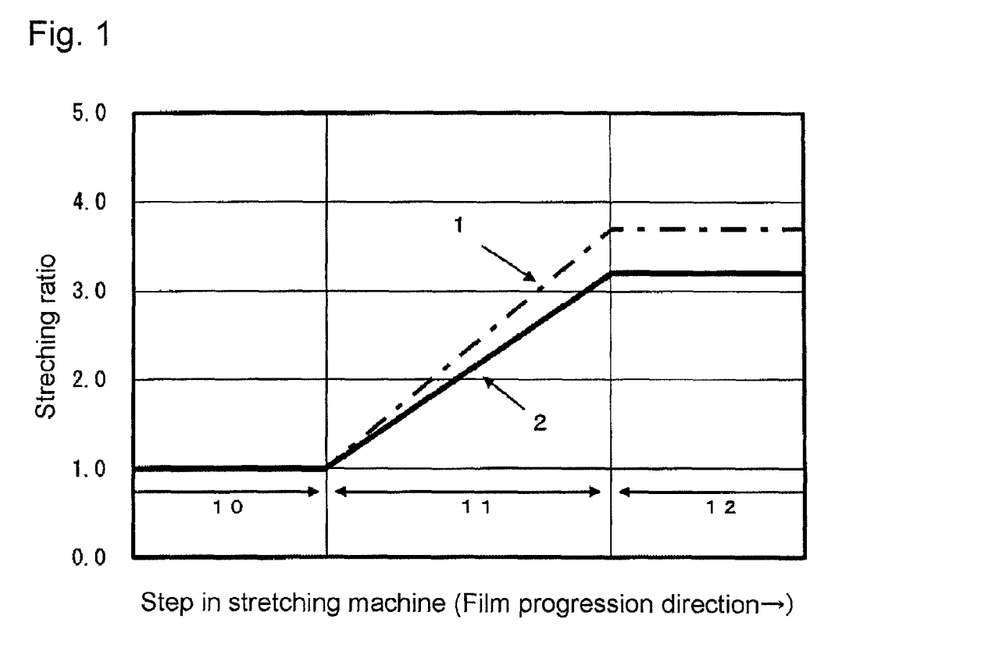
FIG. 1 An illustration view showing relationship between a step in a stretching machine of a film, and a longitudinal stretching ratio or a transverse stretching ratio at film production of Example 1.
Figure 2:
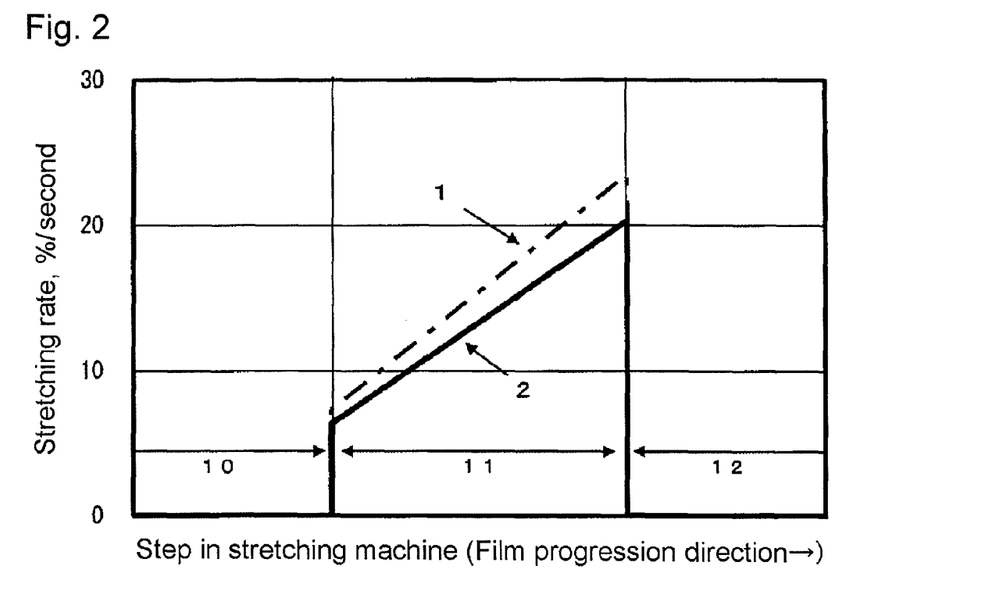
FIG. 2 An illustration view showing relationship between a step in a stretching machine of a film, and a longitudinal stretching rate or a transverse stretching rate at film production of Example 1.

The film was pre-heated with the hot air at 105° C. for 35 seconds, and simultaneously biaxially stretched at 105° C. at a stretching ratio of 3.2 in a longitudinal direction, and 3.7 in a transverse direction. Thereupon, stretching ratios in longitudinal and transverse directions were set as shown in FIG. 1. Stretching rates in longitudinal and transverse directions in this stretching step are as shown in FIG. 2, and were controlled so that a maximum stretching rate in a longitudinal direction became 20.3%/sec, and a maximum stretching rate in a transverse direction became 23.5%/sec. Then, the film was heat-treated at 230° C. for 17.5 seconds in the state where a tenter width was constant, and a clip interval was constant. Further, the film was 3% relation-treated in longitudinal and transverse directions during a stage of cooling to 60° C. over 15 seconds.

Then, the clips grasping both ends of the film were released, and both ends of the film were trimmed, and wound into a roll to produce a biaxially stretched film having a thickness of about 110 μm. When an actual stretching ratio was measured with a lattice-like ratio marker drawn on the unstretched film, the stretching ratio was confirmed to be set as described above.

(5) Properties of Light Diffusion Film

Properties of the light diffusion film obtained in the present Example 1 are shown in Table 1. As seen from Table 1, the light diffusion film obtained by the process of the present invention has excellent heat resistance and mechanical strength which are intrinsic to the biaxially stretched film, and has excellent light transmittance and light diffusibility.

Comparative Example 1

The unstretched film obtained by the same process as that of Example 1 was biaxially stretched by the previously known process.

First, after the film was pre-heated with a group of rolls heated at 75° C., the film was heated to 96° C. using a non-contact infrared heater, and longitudinally stretched 3.4-fold between rolls having different circumferential speeds. Thereupon, a distance between contact points of the film was 200 mm, and a circumferential speed of low speed rolls was 12 m/min. When a film speed between rolls is represented by a value intermediate between a low speed roll circumferential speed and a high speed roll circumferential speed, a speed of the film between rolls becomes 26.4 m/min, and a time of passage between rolls becomes about 0.45 seconds. Therefore, it results in that 3.4-fold stretching, that is, 240% stretching was performed for 0.45 second, and a stretching speed becomes about 530%/sec.

Then, both ends of the longitudinally stretched film were grasped with clips, and the film was transversely stretched. A transverse stretching temperature was 135° C., a transverse stretching ratio was 3.7, and a transverse stretching speed was constant, being 25%/sec. Then, the film was heat-treated at 230° C. for 15 seconds, and relaxation-treated at 2.5% in a width direction during cooling to 60° C.

Then, the clips grasping both ends of the film were released, and both ends of the film were trimmed, and the film was wound into a roll to produce a biaxially stretched film. Properties of the light diffusion film obtained in the present Comparative Example 1 are shown in Table 2.

The light diffusion film obtained in the present Comparative Example 1 had a high haze and good light diffusibility, but had a low total light transmittance, and was of low quality. In addition, a dimensional change rate was inferior to the light diffusion film obtained in Example 1. The light diffusion film obtained in the present Comparative Example was high in a planar orientation degree, and voids were formed around the light diffusion additive. Since an internal haze is higher than that of Example 1, a lower total light transmittance is presumed to be due to influence of the voids.

Comparative Example 2

In the process of Example 1, the raw material of the light diffusion layer (B) was changed to a mixture of 95 parts by mass of PET (M1) and 5 parts by mass of a polystyrene master batch (M2). According to the same manner as that of Example 1 except for the above change, a biaxially stretched film was produced. Properties of the light diffusion film obtained in the present Comparative Example 2 are shown in Table 2.

The light diffusion film obtained in the present Comparative Example 2 was deficient in a haze, had no balance between light diffusibility and total light transmittance required in the light diffusion film, and was of low quality.

Comparative Example 3

In the process of Comparative Example 1, the raw material of the light diffusion layer (B) was changed to a mixture of 50 parts by mass of an amorphous copolymerized polyester having an inherent viscosity of 0.69 dl/g, containing components of 100 mol % of a terephthalic acid unit, and 70 mol % of an ethylene glycol unit and 30 mol % of a neopentyl glycol unit as a diol component, and 50 parts by mass of a polystyrene master batch (M2). In addition, the copolymerized polyester was dried at 60° C. for 72 hours under reduced pressure (1 Torr), and was subjected to mixing with a polystyrene master batch (M2).

According to the same manner as that of Comparative Example 1 except for the above change, a biaxially stretched film was produced. Properties of the light diffusion film obtained in the present Comparative Example 3 are shown in Table 2.

Since the light diffusion film obtained in the present Comparative Example 3 uses an amorphous copolymerized polyester as a raw material polyester of the light diffusion layer (B), heating curling was increased. In addition, a haze was low, being of low quality.

Comparative Example 4

In the process of Example 1, when the film was biaxially stretched using a simultaneous biaxial stretching tenter, a pre-heating temperature was changed to 110° C., and a stretching temperature was changed to 115° C. According to the same manner as that of Example 1 except for the above change, a biaxially stretched film was made. Properties of the light diffusion film obtained in the present Comparative Example 4 are shown in Table 2.

The film obtained in the present Comparative Example 4 had a planar orientation degree (ΔP) of less than 0.080, and a remarkably reduced tensile strength, and was of low quality. In addition, a thickness variation was also deteriorated.

Comparative Example 5

In the process of Example 1, when the film was biaxially stretched using a simultaneous biaxial stretching tenter, both of a pre-heating temperature and a stretching temperature were changed to 92° C. According to the same manner as that of Example 1 except for the above change, a biaxially stretched film was made. Properties of the light diffusion film obtained in the present Comparative Example 5 are shown in Table 2.

The film obtained in the present Comparative Example 5 had a planar orientation degree (ΔP) of more than 0.160, and a reduced haze. And, an internal haze was increased, and a total light transmittance was also reduced.

Example 2

In Example 1, a coated layer was provided on both sides of the unstretched film. As the coating solution, the same coating solution as that of Example 1 was used. In addition, a coating method and a drying method on an (A) side were according to the methods of Example 1, provided that, a wire bar method was adopted as a method of coating a (B) surface side, the coating solution was coated at a wet coating amount of about 20 g/m² and, immediately after coating, the film was guided to a simultaneous biaxial stretching machine. By adopting other producing conditions which were entirely the same as those of Example 1, a biaxially stretched film was made. Properties of the light diffusion film obtained in the present Example 2 are shown in Table 1.

The film obtained in the present Example 2 had a total light transmittance which is further improved than Example 1, and it is seen that it has excellent characteristics as the light diffusion film.

Example 3

After 50 parts by mass of PET (M1) and 50 parts by mass of a polystyrene master bath (M2) as a raw material of the light diffusion layer (B) were dried at 135° C. for 6 hours under reduced pressure (1 Torr), they were mixed, and supplied to an extruder 2. Separately, PET (M1) as a raw material of the supporting layer (A) was dried at 135° C. for 6 hours under reduced pressure (1 Torr), and supplied to an extruder 1. Conditions were set so that a resin temperature at a melting part, a kneading part, a polymer tube, a gear pump, and up to a filter of the extruder was 280° C., and a resin temperature at a polymer tube thereafter was 275° C. and the raw materials supplied to the extruder 1 and the extruder 2 were laminated using a two-layers joining block, and melt-extruded through a die into a sheet. A ratio of a thickness of the (A) layer and that of the (B) layer was controlled at 80:20 using a gear pump for each layer. And, for the filter, a filtering material (nominal filtration accuracy: 10 μm particle 95% cut) of a sintered stainless was used. And, a temperature of the die was controlled so that a temperature of the extruded resin became 275° C.

Then, the extruded resin was cast on a cooling drum at a surface temperature of 40° C., and cooled to solidify while adhered to a cooling drum surface using an electrostatic application method, to make an unstretched film having a thickness of about 2.0 mm. Thereupon, the (A) layer surface was adopted as a surface contacting with a cooling drum. In addition, a multiduct in which a nozzle for blowing a cooling wind and a nozzle for sucking a cooling wind were alternately arranged continuously was disposed along an outer circumference of a cooling drum, and the (B) layer surface was cooled with the air from a position about 30 mm distant from the cooling drum.

Then, according to the same manner as that of Example 1, a coated layer was coated on one side (A) of the resulting unstretched film.

Then, the unstretched film was guided to a simultaneous biaxial stretching machine while both ends of the unstretched film having a coated layer were grasped with clips. The biaxial stretching conditions were entirely the same conditions as those of Example 1 except that a hot air temperature of pre-heating was corrected to 110° C. In addition, also in the present Example, when an actual stretching ratio was measured with a lattice-like ratio marker drawn on the unstretched film, it was confirmed that a stretching ratio was as set.

Properties of the light diffusion film obtained in the present Example 3 are shown in Table 1. As seen from Table 1, the light diffusion film obtained by the process of the present invention has excellent heat resistance and mechanical strength which are intrinsic to the biaxially stretched film, and has excellent light transmittance and light diffusibility.

Example 4

In production of the unstretched film of Example 1, the raw material of the light diffusion layer (B) was changed to a mixture of 97 parts by mass of PET (M1) and 3 parts by weight of a cyclic olefin copolymer having a glass transition temperature of 160° C. (TOPAS6015, manufactured by Topas Advanced Polymers). And, a ratio of a thickness of the A layer and that of the B layer was changed to 90:10 to make an unstretched film having a thickness of 1.2 mm.

The resulting unstretched film was pre-heated with the hot air at 100° C. for 40 seconds, and simultaneously biaxially stretched each 3.5-fold in longitudinal and transverse directions at a constant stretching rate of 50%/sec. Then, the film was heat-treated with the hot air at 220° C. for 10 seconds, and cooled to room temperature to make a biaxially stretched film.

Properties of the light diffusion film obtained in the present Example 4 are shown in Table 1. The film obtained in the present Example 4 had excellent properties as in Example 1.

TABLE 1

| | | Example 1 | Example 2 | Example 3 | Example 4 |
|---|---|---|---|---|---|
| Thickness(μm) | | 111 | 110 | 188 | 101 |
| Haze(%) | | 52.3 | 52.1 | 71.9 | 34.6 |
| Internal haze(%) | | 4.4 | 4.4 | 4.5 | 12.0 |
| Surface haze(%) | | 47.9 | 47.7 | 67.4 | 22.6 |
| Total light transmittance (%) | | 88.8 | 90.4 | 90.2 | 86.9 |
| Planar orientation degree(ΔP) | | 0.126 | 0.128 | 0.130 | 0.134 |
| Tensile strength (MPa) | Longitudinal direction | 193 | 196 | 190 | 175 |
| | Transverse direction | 240 | 227 | 203 | 175 |
| Dimensional stability (%) | Longitudinal direction | 0.2 | 0.2 | 0.3 | 0.8 |
| | Transverse direction | 0.2 | 0.2 | 0.2 | 0.8 |
| Curling(mm) | | <1.0 | <1.0 | <1.0 | <1.0 |
| Thickness variation(%) | | 2.8 | 2.9 | 3.4 | — |

TABLE 2

| | | Comparative Example 1 | Comparative Example 2 | Comparative Example 3 | Comparative Example 4 | Comparative Example 5 |
|---|---|---|---|---|---|---|
| Thickness(μm) | | 99 | 110 | 96 | 103 | 108 |
| Haze(%) | | 61.0 | 19.5 | 27.0 | 71.0 | 27.4 |
| Internal haze(%) | | 12.5 | 2.0 | 5.2 | 12.7 | 6.7 |
| Surface haze(%) | | 48.5 | 17.5 | 21.8 | 58.3 | 20.7 |
| Total light transmittance (%) | | 82.2 | 89.9 | 90.1 | 85.9 | 87.5 |
| Planar orientation degree(ΔP) | | 0.170 | 0.131 | — | 0.071 | 0.163 |
| Tensile strength (MPa) | Longitudinal direction | 205 | 195 | 177 | 63 | 227 |
| | Transverse direction | 238 | 244 | 202 | 57 | 270 |
| Dimensional Stability (%) | Longitudinal direction | 0.8 | 0.2 | — | 0.1 | 0.3 |
| | Transverse direction | 0.4 | 0.2 | — | 0.2 | −0.2 |
| Curling (mm) | | <1.0 | <1.0 | 53 | <1.0 | <1.0 |
| Thickness variation(%) | | 3.5 | 2.7 | — | 22 | 3.1 |

INDUSTRIAL APPLICABILITY

The light diffusion film of the present invention can be used as a light diffusion film for a liquid crystal display, particularly for a large liquid crystal display adopting a direct-type back light unit. In addition, by prism-processing one side thereof, a light diffusion film and a condensing sheet can be integrated, thereby, reduction of the number of back light unit parts, simplification of a producing step, and cost saving can be promoted.

The invention claimed is:

1. A light diffusion film comprising a biaxially stretched laminated film having a supporting layer comprising a crystalline polyester, and a light diffusion layer laminated on at least one side of the supporting layer by a co-extrusion method,
   wherein the light diffusion layer comprises 60 to 98 parts by mass of the crystalline polyester and 2 to 40 parts by mass of a light diffusion additive incompatible with the polyester,
   the light diffusion layer has a thickness that is 4% to 40% of total thickness of the biaxially stretched laminated film, and
   the light diffusion film has a planar orientation degree (ΔP) of 0.080 to 0.160, a total light transmittance of 85% or more, a haze of 30% or more, a surface haze of 20% or more, and an internal haze of 12% or less.

2. The light diffusion film according to claim 1, wherein the light diffusion additive is a thermoplastic resin incompatible with a polyester.

3. The light diffusion film according to claim 2, wherein the thermoplastic resin incompatible with a polyester is an amorphous transparent polymer selected from a polystyrene resin, a styrene-based copolymer resin, a cyclic olefin-based resin, and an acryl-based resin.

4. The light diffusion film according to claim 3, wherein the amorphous transparent polymer is a polystyrene resin or a styrene-based copolymer resin having a melt viscosity of 1000 to 10000 poise.

5. The light diffusion film according to claim 1, wherein the film has a coated layer containing, as a main component, at least one kind of a copolymerized polyester resin, a polyurethane-based resin, or an acryl resin, disposed before stretching and orientation completion of a film, on a surface of the light diffusion layer.

6. A light diffusion film for a condensing substrate, said film having a coated layer containing, as a main component, at least one kind of a copolymerized polyester resin, a polyurethane-based resin, or an acryl resin, on a surface opposite to the light diffusion layer of the light diffusion film as defined in claim 1.

* * * * *